United States Patent [19]

Onigata et al.

[11] 4,390,977
[45] Jun. 28, 1983

[54] APPARATUS FOR MAINTAINING ROTATIONAL SPEED IN DISK REPRODUCING DEVICE

[75] Inventors: Yoshio Onigata; Tsutomu Fukui; Kazuo Yajika, all of Tokorozawa, Japan

[73] Assignee: Universal Pioneer Corporation, Tokyo, Japan

[21] Appl. No.: 321,016

[22] Filed: Nov. 13, 1981

[30] Foreign Application Priority Data

Nov. 17, 1980 [JP] Japan ............................ 55-165062[U]

[51] Int. Cl.³ .......................... G11B 27/22; G11B 7/00
[52] U.S. Cl. ........................................ 369/50; 369/45; 358/336; 358/338; 358/342
[58] Field of Search ................. 358/128.5, 128.6, 322, 358/336, 338, 342; 369/43, 44, 50, 111, 45, 47, 53, 54; 360/38, 73, 75

[56] References Cited

U.S. PATENT DOCUMENTS

| | | | |
|---|---|---|---|
| 4,190,860 | 2/1980 | Somers et al. | 358/128.5 |
| 4,223,349 | 9/1980 | Dakin et al. | 358/128.5 |
| 4,228,326 | 10/1980 | Dakin et al. | 369/50 |
| 4,236,050 | 11/1980 | Winslow et al. | 360/73 X |
| 4,239,942 | 12/1980 | Van Alem et al. | 360/38 |

Primary Examiner—Bernard Konick
Assistant Examiner—Donald McElheny, Jr.
Attorney, Agent, or Firm—Sughrue, Mion, Zinn, Macpeak and Seas

[57] ABSTRACT

In a disc reading device wherein the rotating speed is normally controlled by detecting the synchronizing signal part of a reproduced signal, a second speed control circuit is included for measuring the speed of the disc and controlling the speed to a desired value independently of the detected synchronizing signals. When signal drop-out or the like occurs, the second speed control circuit takes over.

11 Claims, 3 Drawing Figures

APPARATUS FOR MAINTAINING ROTATIONAL SPEED IN DISK REPRODUCING DEVICE

BACKGROUND OF THE INVENTION

This invention relates to a disc reproducing device in which, when it is difficult to utilize synchronizing signals recorded on a disc, the speed of rotation of the disc is maintained approximately at a predetermined value.

When a video disc data reading device scans a scratch on a disc surface, or when the tracking servo or focus servo is unlocked, it is sometimes substantially impossible to read data from the disc and no reproduction signal is outputted. As a result, the demodulation output includes noise and the separated horizontal synchronizing signal does not have correct time base information, whereby the phase comparator which produces a time base error signal is operated erroneously. When the data reading position on the disc is scanned across the data tracks, the same disadvantages tend to occur. Therefore, the spindle servo unit is operated irregularly and the rotating speed of the spindle motor, i.e., the rotating speed of the disc, is deviated from its normal value. The worst case of this could lead to running of the disc at extremely high speed with consequent damage to the device.

Even if it is recovered from such a state, it is still difficult to produce correct time base information from the horizontal synchronizing signal because of the effects of demodulation output noise on the speed of rotation vs. demodulation amplitude output characteristic of the demodulation circuit and the time constant of the horizontal synchronizing separator circuit. Accordingly, it is difficult to lock the spindle servo in a short time.

SUMMARY OF THE INVENTION

This invention is intended to eliminate the above-described difficulties. Briefly, this is achieved by providing a first drive circuit operated by a first error signal obtained from a synchronizing signal and a reference signal and a second drive circuit operated by a second error signal obtained from a motor speed detection signal and a reference signal. The two drive circuits are switched to alternately control a disc driving spindle motor, the second error signal being utilized to maintain the speed of rotation of the disc approximately at a predetermined value when it is impossible to produce correct time base error from a reproduced synchronizing signal of the disc and the first error signal being utilized to rotate the disc at a predetermined speed at all other times when it is possible to read data from the disc.

BRIEF DESCRIPTION OF THE DRAWINGS

One embodiment of this invention will now be described with reference to the accompanying drawings, in which.

DETAILED DESCRIPTION OF THE INVENTION

Figure 1:
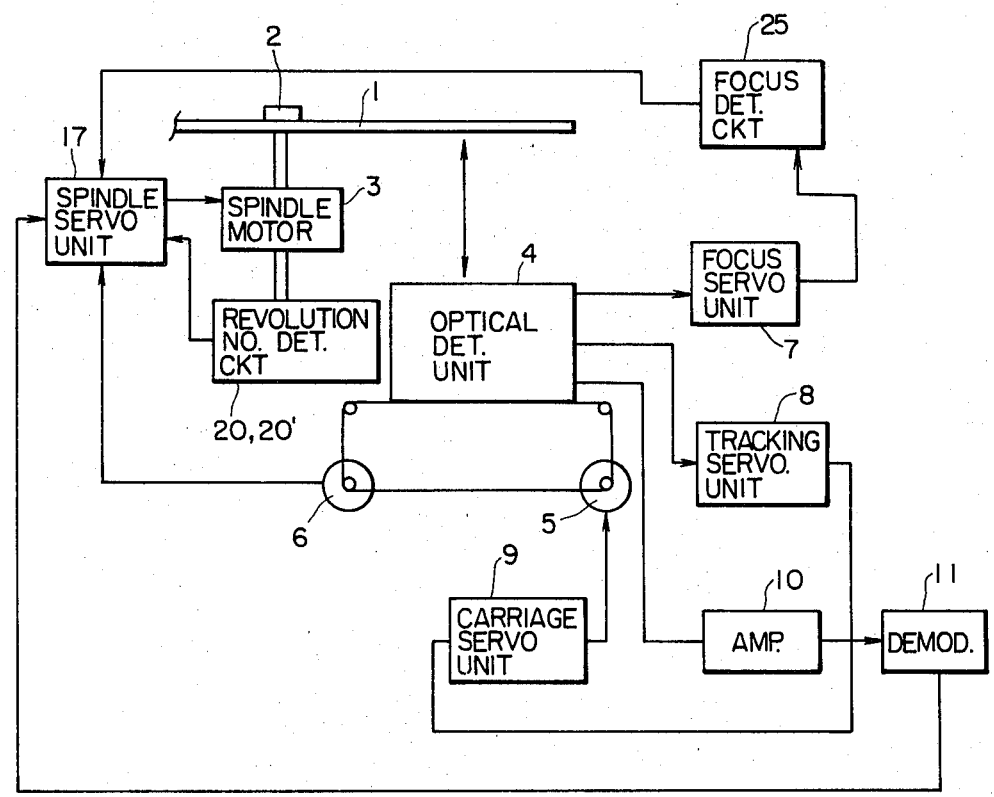
FIG. 1 is an explanatory diagram, partly as a block diagram, showing the arrangement of one embodiment of this invention.

As shown in FIG. 1, a disc 1 on which data is recorded is held by a clamper 2 and is turned by a spindle motor 3.

A data reading unit, e.g. an optical detecting unit 4, is disposed in such a manner as to confront the surface of the disc 1. The optical detecting unit 4 is moved in the radial direction of the disc 1 by a carriage motor 5, and the amount of movement of the unit 4 is detected by a reproduction position detector 6.

The optical detecting unit 4 is provided with a focus servo unit 7 adapted to focus a light beam on the disc surface, and a tracking servo unit 8 adapted to set a beam irradiation position at a data track on the disc.

A signal from the tracking servo unit 8 is applied to a carriage servo unit 9 to operate the latter unit 9. The carriage servo unit 9 drives the carriage motor 5 so as to control the beam irradiation position in the radial direction of the disc 1.

Data read from the disc surface is amplified by an amplifier 10 and demodulated by a demodulator 11. The reproduction signal is sent to a spindle servo unit 17, and a phase error signal, which is obtained from a comparison of a reference signal and a horizontal synchronizing signal obtained from the reproduction signal, is generated in the spindle servo unit 17 and used to drive the spindle motor 3, as will be described in more detail with reference to FIG. 2.

Figure 2:
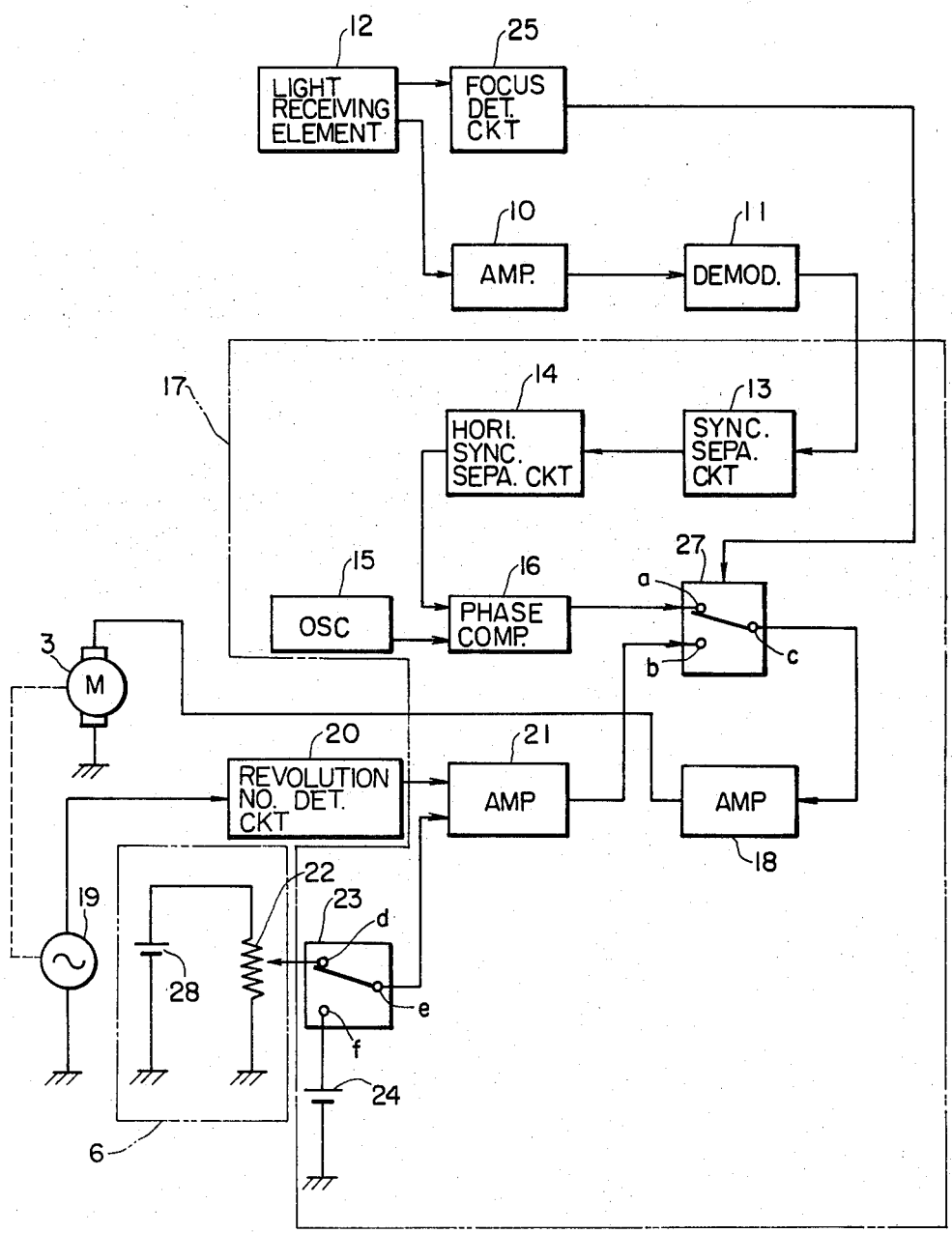
FIG. 2 is a block diagram showing one example of an electrical control circuit according to one embodiment of this invention.

One example of an arrangement for the spindle servo unit 17 is as shown in FIG. 2. A light receiving element 12 in the optical detecting unit 4 operates to optically detect the data track which is irradiated by the light beam. The light receiving element 12 is connected through the amplifier 10 to the demodulator 11. The light receiving element 12 is further connected to the focus detecting circuit 25. This connection can either be direct or through the focus servo unit 7 as shown in FIG. 1.

The demodulator 11 is connected through a synchronizing separator circuit 13 to a horizontal synchronizing separator circuit 14. The horizontal synchronizing separator circuit 14 and an oscillator 15 adapted to output the reference signal are connected to a phase comparator 16.

The phase comparator 16 is connected to a terminal a of a switch circuit 27, the armature terminal c of which is connected through an amplifier 18 to the spindle motor 3.

The spindle motor 3 is coupled directly to a tachometer generator 19, which is connected to a revolution number detecting circuit 20. The circuit 20 is connected through an amplifier 21 to a terminal b of the switch circuit 27.

The reproduction position detector 6 comprises a power source 28 and a potentiometer 22 the movable contact of which is moved in association with the movement of the optical detecting unit 4 in the radial direction of the disc. The reproduction position detector 6 is connected through a terminal d of a switch 23 and through the amplifier 21 to the terminal b of the switch circuit 27.

When data from a CLV (constant linear velocity) disc is reproduced by changing the speed of rotation of the disc 1 as the data read position is moved radially of the disc 1, the armature of the switch 23 which is connected to its armature terminal e is tripped over to the terminal d, so that the voltage of the power source 28, after being divided into a value corresponding the present read position, is applied to the amplifier 21. The switch 23 will thus produce an output signal having a value representing a speed at which the disc should be rotated when the head is at its present position, and the amplifier 21 will accordingly produce a signal corresponding to the difference between the desired speed and the actual speed measured by detector circuit 20.

When, on the other hand, data from a CAV (constant angular velocity) disc is produced with the speed of rotation of the disc 1 being constant regardless of the radial position of the optical detector 4, the armature of the switch 23 is tripped over to a terminal f, so that the output of a power source 24 having a voltage corresponding to the desired constant speed of rotation of the CAV disc is supplied to the amplifier 21.

When the beam focus is shifted, i.e. when the focus servo unit 7 is unlocked, the focus detecting circuit 25 provides an output signal which causes the armature of the switch circuit 27 to be tripped from the terminal a to the terminal b.

The operation of the disc reproducing device according to this invention will now be described. Data which has been detected from the data track of the disc 1 by the light receiving element 12 is demodulated into a composite video signal by the demodulator 11. The composite video signal is applied to the synchronizing separator circuit 13 and the horizontal synchronizing separator circuit 14, as a result of which the latter produces a horizontal synchronizing signal at its output. The horizontal synchronizing signal and the reference signal outputted by the oscillator 15 are subjected to comparison in the phase comparator 16, as a result of which a phase error signal is provided. The phase error signal thus provided is applied through the switch circuit 27 to the spindle motor 3 to drive the motor 3.

When the beam focus is shifted more than a predetermined value, the focus detecting circuit 25 (FIG. 2) detects that it is impossible to read data out of the disc, and the focus detecting circuit 25 outputs an appropriate signal. As a result, the armature of the switch circuit 27 is tripped from the terminal a over to the terminal b.

The rotating speed of the spindle motor 3 is indicated by the output of the tachometer generator 19, and the revolution number detecting circuit 20 provides a voltage proportional to the speed of rotation of the spindle motor 3.

In the case where the disc being read is a CLV disc, the reproduction position detector 6 detects the data read position (or the beam irradiation position) in the radial direction of the disc and produces a signal corresponding to the proper angular speed which in combination with the present read position will yield the desired constant linear velocity. The signals from switch 23 and circuit 20 are compared in differential amplifier 21, and a signal corresponding to the difference therebetween is provided as an output by the amplifier 21.

With the switch 27 switched to contact b, the output of the amplifier 21 is applied through the switch circuit 27 and amplifier 18 to the spindle motor 3 to maintain a substantially proper speed of rotation of the spindle motor 3.

In the case where a CAV disc is being read, the output of the power source 24 indicating the desired constant angular velocity is applied to the amplifier 21. Therefore, similarly as in the case of the CLV disc, the speed of rotation of the disc 1 is controlled to a predetermined value.

When the beam focus has been corrected, it is detected that data can be read from the disc, and the armature of the switch circuit 27 is tripped from the terminal b over to the terminal a. As a result, the phase error signal from the phase comparator 16 is again applied through the switch circuit 27 to the spindle motor 3 to control the latter.

Figure 3:
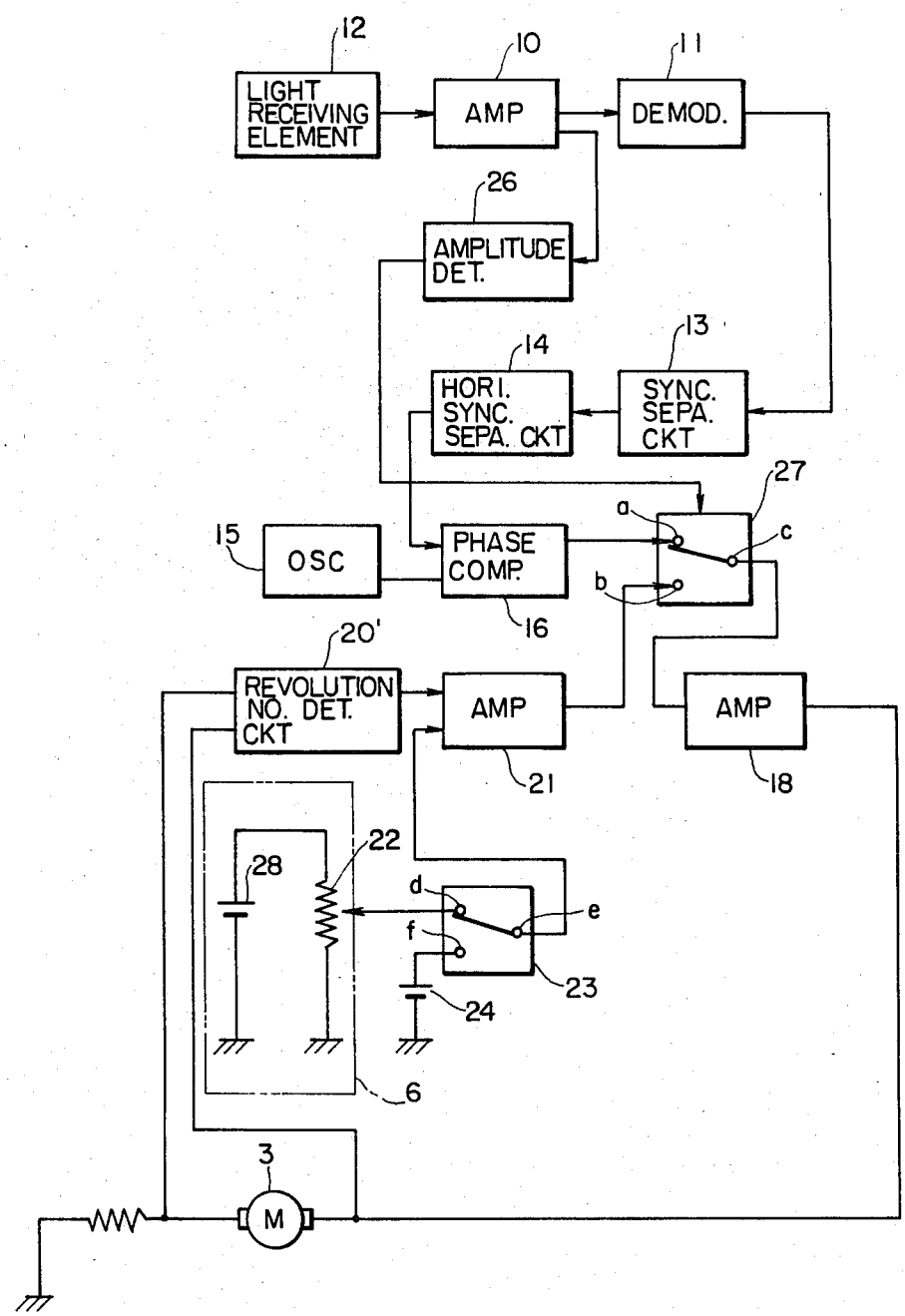
FIG. 3 is a block diagram of a further example of a control circuit arrangement according to this invention.

In the above-described embodiment of FIGS. 1 and 2, the focus detecting circuit 25 detects whether or not data can be read out of the disc. However, the arrangement may be modified as shown in FIG. 3. In FIG. 3, instead of the focus detecting circuit 25, an amplitude detecting circuit 26 is used to determine the amplitude of the reproduction signal. When the amplitude of the reproduction signal is equal to or higher than a reference level, the armature of the switch circuit 27 is tripped from the terminal b over to the terminal a, and when it is lower than the reference level the armature is tripped from the terminal a over to the terminal b.

In the above-described embodiments, the rotating speed of the spindle motor 3 is detected from the output voltage of the tachometer generator 19. However, it may be so modified that, as shown in FIG. 3, the revolution number detecting circuit 20 detects the rotating speed of the spindle motor 3 directly from the terminal voltage and terminal current of the motor 3.

As is apparent from the above description, according to this invention, during the normal operation the rotating speed of the disc is controlled by the phase error signal which is obtained from a comparison of the synchronizing signal and the reference frequency signal, and when signal reproduction is substantially impossible, or for some other reasons the suitable synchronizing signal is not available for comparison with the reference frequency signal and therefore the disc driving motor is controlled by the error signal and the reference speed signal. Accordingly, even when no reproduction signal is provided, the rotating speed of the disc is maintained substantially correct, and after reproduction of the data becomes possible again, the frequency and phase of the synchronizing signal can again be locked exactly with respect to the reference frequency signal in a short time.

This invention can be extensively applied to a data reproducing device in which the spindle servo system control signal depends on data recorded on a disc, as well as to an optical video disc player.

What is claimed is:

1. A disc reading device in which data recorded on a disc is reproduced by a signal reading unit to provide a reproduction signal, a synchronizing signal is extracted from said reproduction signal, said synchronizing signal and a first reference signal are compared in a first comparison means to provide a first error signal and a rotating means rotates said disc at a speed in accordance with a speed control signal, the improvement comprising:

detecting means for detecting the rotating speed of said disc independently of said synchronizing signals;

generating means for generating a second reference signal corresponding to a desired disc rotating speed;

second comparison means for producing a second error signal in accordance with the difference between said second reference signal and the output of said detecting means; and switching means for selectively applying either of said first and second error signals to said rotating means as said speed control signal.

2. The disc reading device as claimed in claim 1, wherein said switching means for selectively applying comprises means receiving said first and second error signals at respective first and second inputs and providing a selected one of said inputs as said speed control signal in response to a switch control signal.

3. The disc reading device as claimed in claim 2, further comprising second detecting means for providing an output signal in response to insufficient quality of said reproduction signal, said second detecting means output signal comprising said switch control signal and said switch means providing said second error signal as said speed control signal in response to said second detecting means output signal.

4. The disc reading device as claimed in claim 3, wherein said data is reproduced by an optical beam reflected from said disc to a light receiving element, said second detecting means comprising focus detecting means for providing said output signal in response to insufficient focus of said reflected optical beam.

5. The disc reading device as claimed in claim 3, wherein said second detecting means provides its output when the amplitude of said reproduction signal falls below a predetermined level.

6. The disc reading device as claimed in claim 1, wherein said second reference signal corresponds to a desired constant angular velocity of said disc.

7. The disc reading device as claimed in claim 1, wherein said second reference signal corresponds to a desired constant linear velocity of said disc.

8. The disc reading device as claimed in claim 7, wherein said generating means comprises a voltage source and a potentiometer connected across said voltage source and having a wiper, the position of said wiper varying in accordance with the radial position of said signal reading unit.

9. The disc reading device as claimed in any one of claims 1-6, wherein said generating means comprises:
   a first signal source for providing an output corresponding to a desired constant linear velocity of said disc with respect to said signal reading unit;
   a second signal source for providing an output corresponding to a desired constant angular velocity of said disc; and
   means for selectively applying either said first signal source output or said second signal source output as said second reference signal.

10. The disc reading device as claimed in claim 1, wherein said disc is driven by an electric motor and said detecting means monitors the rotating speed of said electric motor.

11. The disc reading device as claimed in claim 10, further comprising a tachometer generator for generating a signal representing the speed of said electric motor, and said detecting means monitors the signal from said tachometer generator.

* * * * *